(12) United States Patent
McDowall et al.

(10) Patent No.: US 7,472,885 B2
(45) Date of Patent: Jan. 6, 2009

(54) COMPACT, LIGHTWEIGHT CABIN PRESSURE CONTROL SYSTEM BUTTERFLY OUTFLOW VALVE WITH REDUNDANCY FEATURES

(75) Inventors: Gregor McDowall, Phoenix, AZ (US); Darrell W. Horner, Oro Valley, AZ (US); Thomas D. Stamm, Tucson, AZ (US); Chibuya K. Siame, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 316 days.

(21) Appl. No.: 11/369,344

(22) Filed: Mar. 6, 2006

(65) Prior Publication Data

US 2007/0205386 A1 Sep. 6, 2007

(51) Int. Cl.
*F16K 1/22* (2006.01)
(52) U.S. Cl. .................. 251/305; 285/242; 285/417
(58) Field of Classification Search ............... 251/305, 251/306, 307; 285/145.4, 242, 403, 408, 285/417, 238, 239
See application file for complete search history.

(56) References Cited

U.S. PATENT DOCUMENTS

| 2,830,521 | A |   | 4/1958  | Fischer et al. |
|-----------|---|---|---------|----------------|
| 2,846,934 | A |   | 8/1958  | Mauldin |
| 3,142,502 | A | * | 7/1964  | Luther .................. 285/242 |
| 4,777,977 | A |   | 10/1988 | Platusich |
| 4,899,984 | A | * | 2/1990  | Strickler et al. .............. 251/306 |
| 5,244,237 | A | * | 9/1993  | Harvey ...................... 285/55 |
| 5,421,781 | A | * | 6/1995  | Mackellar .................... 464/181 |
| 5,971,026 | A |   | 10/1999 | Beran |
| 6,138,988 | A | * | 10/2000 | Bouvet et al. ............... 251/306 |
| 6,308,992 | B1| * | 10/2001 | Mitsui et al. ................. 285/239 |
| 6,352,241 | B1|   | 3/2002  | Hannewald et al. |
| 6,505,643 | B2| * | 1/2003  | Scholten et al. ............. 137/554 |
| 6,589,380 | B2|   | 7/2003  | Gnage et al. |
| 6,646,395 | B2|   | 11/2003 | Reimann |
| 6,764,062 | B1|   | 7/2004  | Daly |
| 6,783,114 | B2|   | 8/2004  | Sandhu et al. |

\* cited by examiner

*Primary Examiner*—John K Fristoe, Jr.
(74) *Attorney, Agent, or Firm*—Oral Caglar, Esq.

(57) ABSTRACT

A relatively compact, lightweight outflow valve assembly includes suitable redundancy features that allow the valve assembly to meet regulatory requirements for certain postulated single point failures. The valve assembly includes a valve body that is constructed at least partially of a non-metallic material and has an outer surface and an inner surface that defines a flow passage having at least two flow ports. A sleeve is disposed within the valve body flow passage that is constructed at least partially of a metallic material. The sleeve has a flow passage formed therein that is in fluid communication with the valve body flow passage flow ports. A valve element is disposed within the sleeve flow passage and is moveable between at least an open position and a closed position. A plurality of brackets is mounted on the valve body outer surface and is coupled to the sleeve. When the valve assembly is installed in an aircraft, the plurality of brackets further couples the sleeve to the aircraft fuselage.

17 Claims, 4 Drawing Sheets

COMPACT, LIGHTWEIGHT CABIN PRESSURE CONTROL SYSTEM BUTTERFLY OUTFLOW VALVE WITH REDUNDANCY FEATURES

TECHNICAL FIELD

The present invention relates generally to outflow valves and, more particularly, to a compact, lightweight outflow valve.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

To maintain aircraft cabin altitude within a relatively comfortable range, cabin pressure control systems may be equipped with one or more outflow valves. An outflow valve can assist in controlling cabin pressure by regulating air flow out of the cabin. One particular type of outflow valve that may be used is a butterfly outflow valve. A butterfly outflow valve typically includes a flapper or gate, which is typically used as the control element to regulate the flow of air out of the cabin. More particularly, the flapper is coupled to a shaft that is rotationally mounted to the outflow valve body. An actuator, which is coupled to the shaft, positions the flapper element in response to commands from a controller to thereby regulate the air flow out of the cabin.

Recently, there has been a move toward providing outflow valves that are relatively lightweight and compact, especially for the relatively newer generation lightweight and high altitude capable business and regional jet aircraft. Thus, it is desirable that the outflow valve body be constructed from a relatively strong, yet lightweight plastic or other composite material. Outflow valves constructed using these materials are generally safe, reliable, and robust. However, certain regulatory requirements require the outflow valve meet certain standards for postulated single point failures, such as a postulated crack in the outflow valve body. Because the crack propagation properties of certain plastics and other composite materials is not well defined, meeting these regulatory standards may not be possible.

Hence, there is a need for an outflow valve that is relatively strong and lightweight, is fairly simple to design and construct, and thus fairly inexpensive, and that can meet regulatory requirements for certain postulated single point failures. The present invention meets at least these needs.

BRIEF SUMMARY

A relatively compact and lightweight outflow valve is provided that is fairly simple to design and construct, and that meets regulatory requirements for certain postulated single point failures.

In one embodiment, and by way of example only, an outflow valve assembly includes a valve body, a sleeve, a valve element, and a plurality of brackets. The valve body is constructed at least partially of a non-metallic material and has an outer surface and an inner surface that defines a flow passage having at least two flow ports. The sleeve is disposed within the valve body flow passage, is constructed at least partially of a metallic material, and has a flow passage formed therein that is in fluid communication with the valve body flow passage flow ports. The valve element is disposed within the sleeve flow passage and is moveable between at least an open position and a closed position. Each of the plurality of brackets is mounted on the valve body outer surface and is coupled to the sleeve. In some embodiments, each of the plurality of brackets is further configured to be coupled to an aircraft fuselage, thereby also coupling the sleeve to the fuselage.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
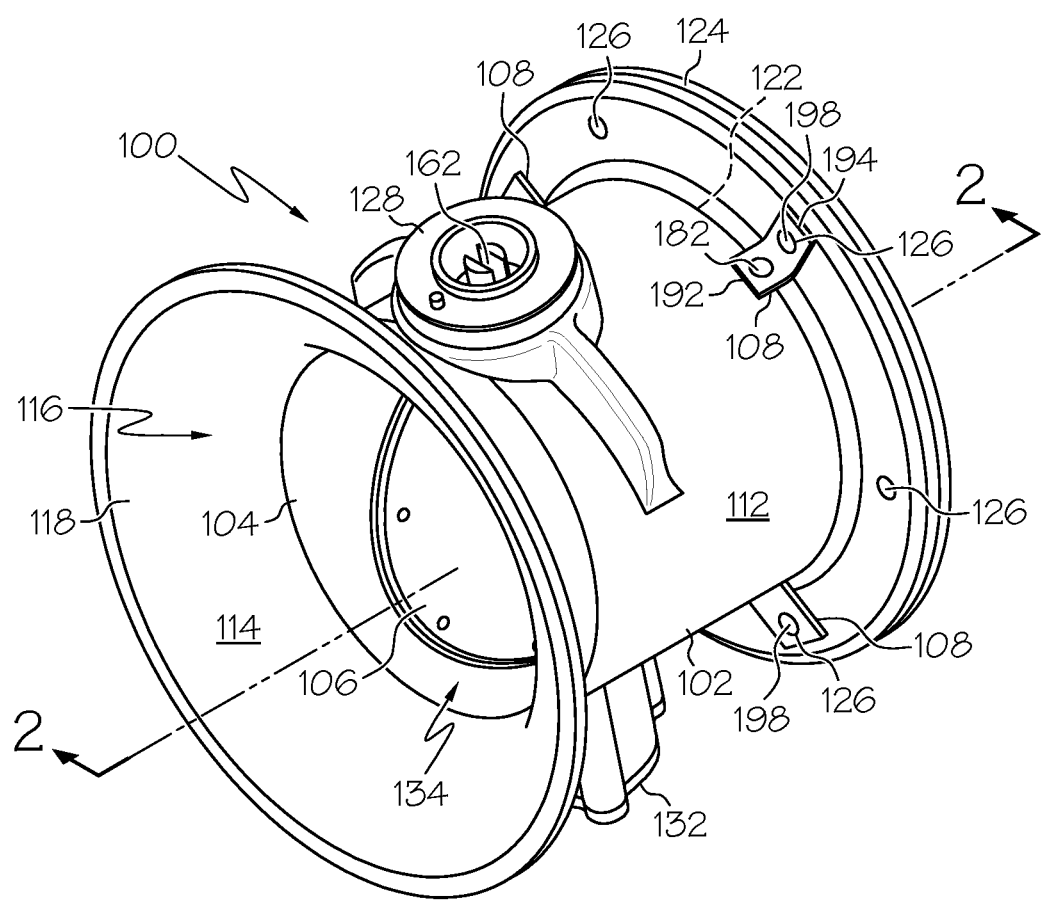
FIG. 1 is a perspective view showing one embodiment of an outflow valve assembly.
Figure 2:
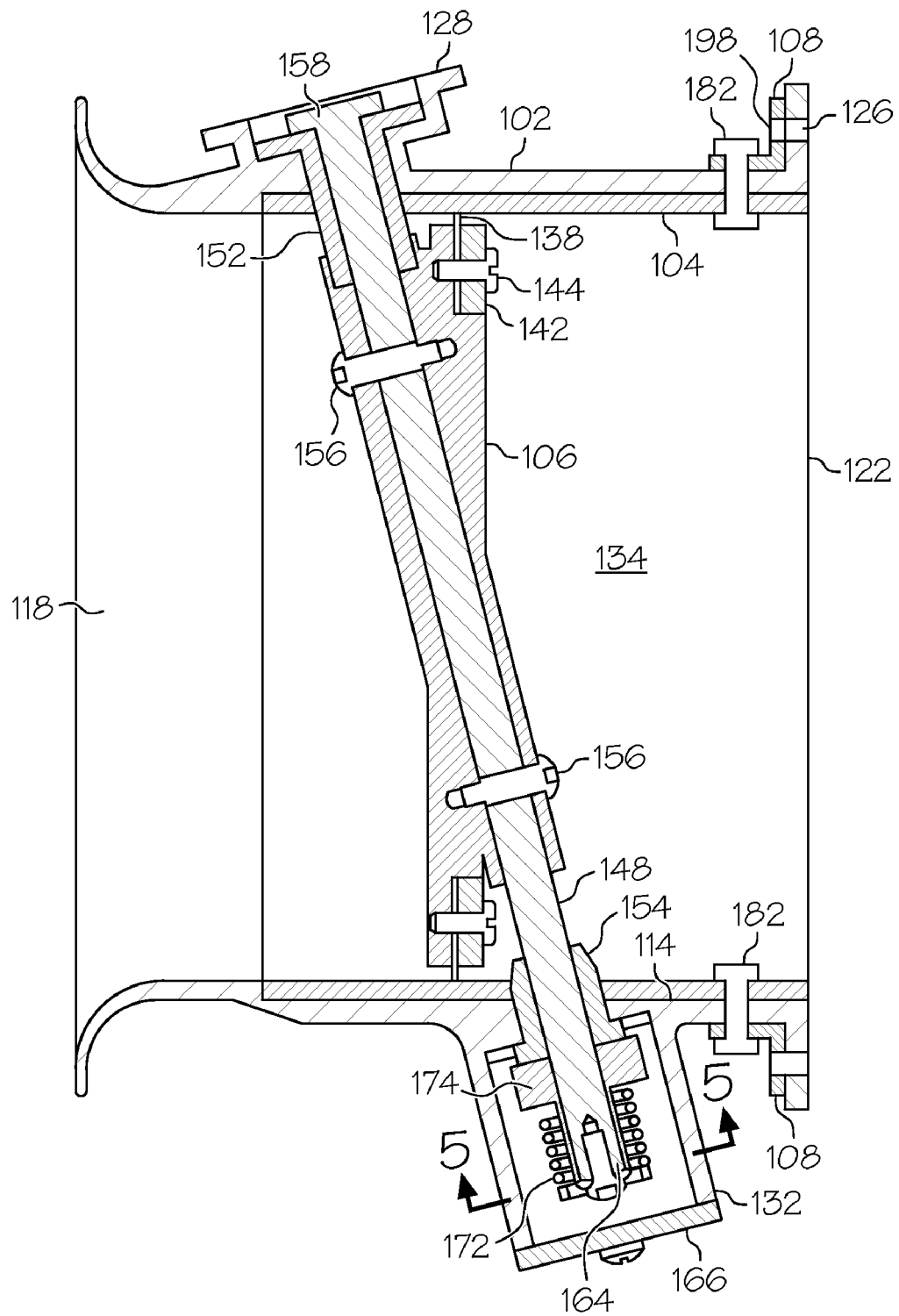
FIG. 2 is a cross-sectional view taken along line 2-2 of FIG. 1 showing the outflow valve in a closed position.
Figure 3:
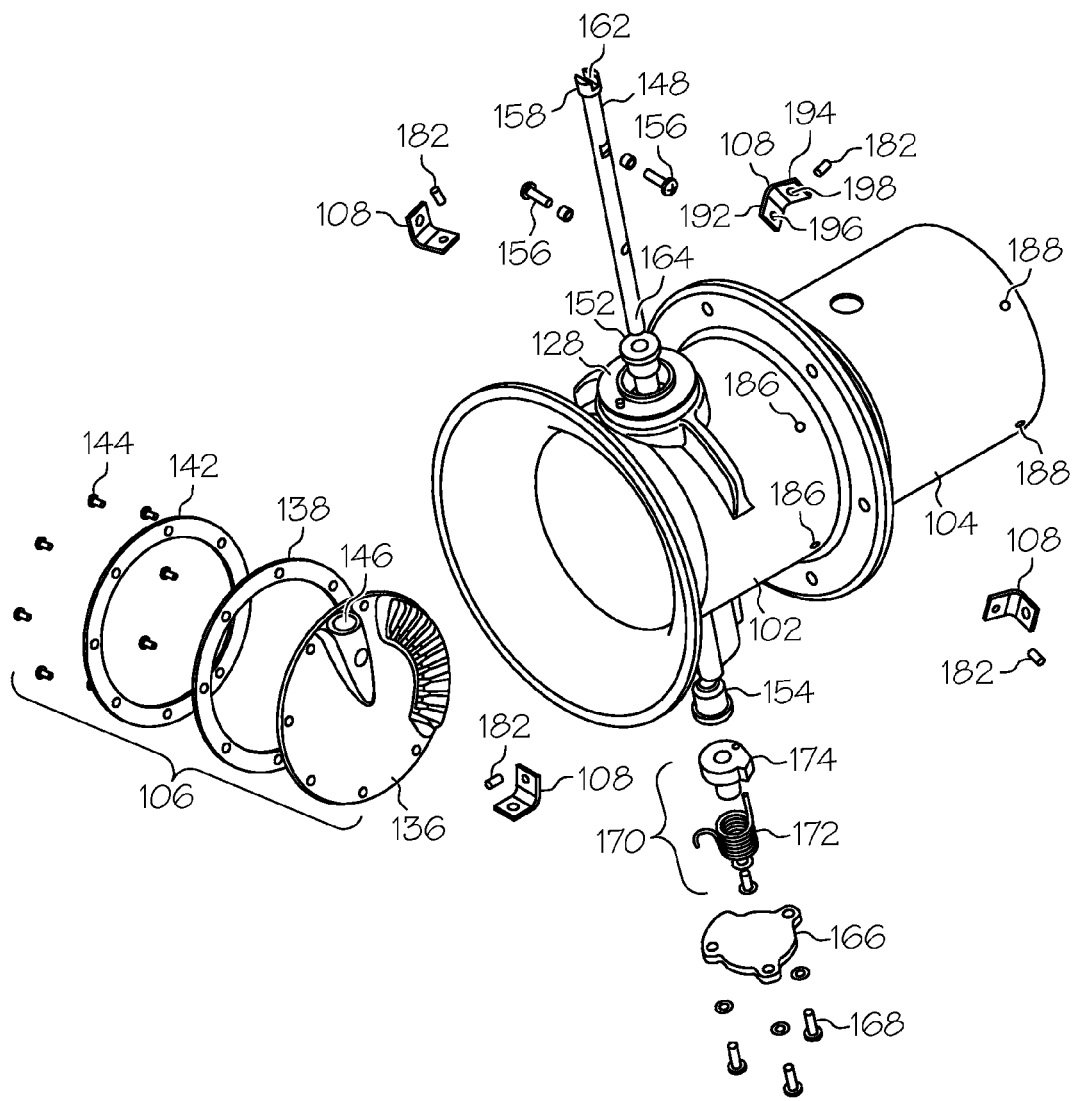
FIG. 3 is an exploded perspective view of the outflow valve assembly of FIG. 1.

With reference to FIG. 1-3, an exemplary embodiment of an outflow valve 100 that may be used to control aircraft cabin pressure is shown and includes a valve body 102, a sleeve 104, a valve element 106, and a plurality of brackets 108. The valve body 102 includes an outer surface 112, and an inner surface 114 that defines a flow passage 116 having at least a first flow port 118, a second flow port 122. The valve body 102 is preferably adapted to mount to an aircraft fuselage (not shown), such that the first flow port 118 is in fluid communication with the aircraft cabin and the second flow port 122 is in fluid communication with the ambient environment outside the fuselage.

The valve body 102 may be constructed of any one of numerous molded plastic/composite materials including, for example, fiber-reinforced polyetherimide (PEI), fiber-reinforced polyetheretherketon (PEEK), or any one of numerous other moldable composite materials. The valve body 102 is preferably molded such that the first flow port 116 is a bell-shape, which is a shape that increases air speed and reduces total pressure drop. The valve body 102 is also molded to include a mount flange 124 proximate the valve body second flow port 122. The mount flange 124 extends radially outwardly from the valve body 102, and includes a plurality of evenly spaced fastener openings 126. A non-illustrated fastener extends through each of these openings 126 to mount the valve body 102 to a non-illustrated aircraft bulkhead. In addition, the valve body 102 is also preferably molded to include, among other things, an actuator mount surface 128, and a valve closure and rotational stop mechanism housing 132.

Figure 4:
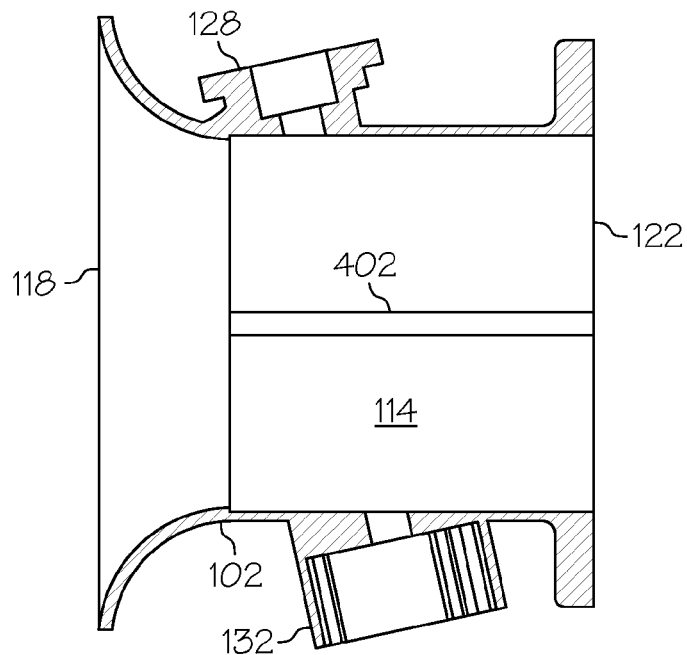
FIG. 4 is a cross-sectional view of an exemplary valve body that is used to construct the valve assembly of FIGS 1-3.

The sleeve 104 is disposed within the valve body flow passage 116 and has a flow passage 134 formed therein that is in fluid communication with the valve body first and second flow ports 118, 122. Thus, the valve 100 is implemented with a dual-wall flow passage, in which the sleeve 104 serves as one wall, and at least a portion of the valve body inner surface 114 serves as another wall. Preferably, the sleeve 104 is disposed within the valve body flow passage 116 after the valve body 102 has been molded, and is bonded to valve body inner surface 114 using a suitable adhesive. In this regard, and as shown most clearly in FIG. 4, the valve body 102 is preferably molded to include a plurality of ribs 402 on at least a portion of its inner surface 114. The ribs 402, only one of which is shown in FIG. 4, extend radially inwardly from the valve body inner surface 114 a predetermined distance and are used to locate the sleeve 104 within the valve body flow passage 116. It will be appreciated that the valve body 102 may, in alternative embodiments, be implemented without the ribs 402. In either case, however, it is preferable that the bond between the sleeve 104 and the valve body inner surface 114 does not fuse the sleeve 104 to the valve housing inner surface 114 or form a single walled element. Rather, it is preferred that the bond is formed such that the dual-wall flow passage configuration is maintained, which provides various advantages including, for example, redundancy. It will additionally be appreciated that the sleeve 104 is preferably constructed at least partially of a metallic material. Although any one of numerous suitable materials may be used, in a particular preferred embodiment the sleeve is constructed of aluminum, or at least partially of aluminum.

The valve element 106 is rotationally disposed within the sleeve flow passage 134 and is configured to rotate through a plurality of positions, from a fully open position to a fully closed position, to thereby control cabin pressure in the aircraft cabin into which it is installed. Although the valve element 106 may be variously configured to provide this functionality, in the depicted embodiment, it is configured as a butterfly plate assembly that includes a butterfly plate 136, a wiper seal 138, and a reinforcing ring 142, which are coupled together via a plurality of fasteners 144. The butterfly plate 136 may be constructed of a suitable plastic/composite material or metal that is molded to a desired geometry and with suitable interface features. Some suitable exemplary construction materials include fiber-reinforced PEI, fiber-reinforced PEEK, or aluminum. Some of the suitable interface features with which the butterfly plate 136 is preferably molded include, but are not limited to, a mounting interface for the reinforcing ring 142, and a shaft sleeve 146 that preferably extends through the butterfly plate 136 at an angle.

The wiper seal 138 is a flat annular ring made of, for example, dacron reinforced silicon material, and is disposed between the butterfly plate 136 and the reinforcing ring 142. It will be appreciated that this material and shape are merely exemplary, and that the wiper seal 138 could be constructed of any one of numerous other suitable materials and have any one of numerous other suitable shapes. The reinforcing ring 142 is preferably manufactured from steel, but could be formed of any one of numerous other suitable materials.

No matter the specific configuration of the valve element 106, in the depicted embodiment it is seen that the valve element 106 is rotationally disposed within the sleeve flow passage 134 via a shaft 148. More specifically, the shaft 148 is rotationally mounted on the valve body 102 via first and second shaft reinforcement sleeves 152, 154, and extends through valve element 106 via the shaft sleeve 146. In the depicted embodiment, the shaft reinforcement sleeves 152, 154, in addition to providing reinforcement to the shaft 148, also preferably function as bearings. As such, the shaft reinforcement sleeves 152, 154 are preferably implemented with appropriate friction and wear properties. In alternative embodiments, the shaft reinforcement sleeves 152, 154 do not function as bearings, and instead suitable ball bearings are included in the valve 100. In these alternative embodiments, the shaft reinforcement sleeves 152, 154 may be press fit onto, or tolerance fit over, the shaft 148.

The shaft 148 is preferably coupled to the butterfly plate 136 via a plurality of valve element mount fasteners 156. It will be appreciated, however, that the butterfly plate 136 could instead include an internal serration, or other means, to mate with the shaft 148. Moreover, although the shaft 148 is depicted as being constructed as a single shaft, it will be appreciated that it could also be constructed of two or more shafts. No matter the specific construction of the shaft 148, a first end 158 thereof preferably includes an actuator interface 162, such as the depicted slot, that is configured to mate with a non-illustrated valve actuator. The actuator, which may be an electromechanical, pneumatic, or hydraulic type of actuator, is used to supply a drive force to the shaft 148 to move the valve element 106 to a desired position. The second end 164 of the shaft 148 is configured to mate with a valve closure and rotational stop mechanism 170, a preferred embodiment of which will now be described.

The valve closure and rotational stop mechanism 170 is disposed within the valve closure and rotational stop mechanism housing 132 and is enclosed therein via a cover plate 166 and suitable fasteners 168. The valve closure and rotational stop mechanism 170 includes a torsion spring 172 and a shaft boss 174. The torsion spring 172 surrounds the shaft second end 164 and is coupled between the valve closure and rotational stop mechanism housing 132 and the shaft boss 174. The torsion spring 172 is configured to supply a bias torque to the shaft 148 that biases the valve element 106 toward the fully closed position. In the depicted embodiment, the torsion spring 172 is implemented as a coil spring. It will be appreciated, however, that the torsion spring 172 could alternatively be implemented using any one of numerous other types of springs including, for example, a leaf spring, a lever spring, a power spring, or a compression spring.

Figure 5:
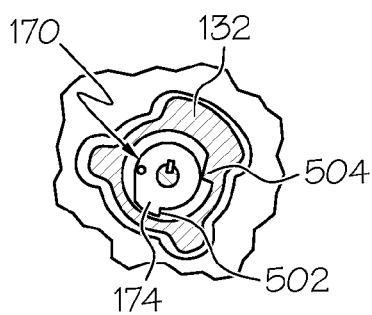
FIG. 5 is a cross-sectional view taken along line 5-5 of FIG. 2.

The shaft boss 174 is mounted on the shaft second end 164 and, as shown most clearly in FIG. 5, includes a stop surface 502 that protrudes therefrom. The stop surface 502 is configured to selectively engage an end-of-travel stop 504 that, at least in the depicted embodiment, is integrally formed as part of the valve closure and rotational stop mechanism housing 132. The stop surface 502 engages the end-of-travel stop 504 when the valve element 106 is moved to its fully closed position.

Figure 4A:
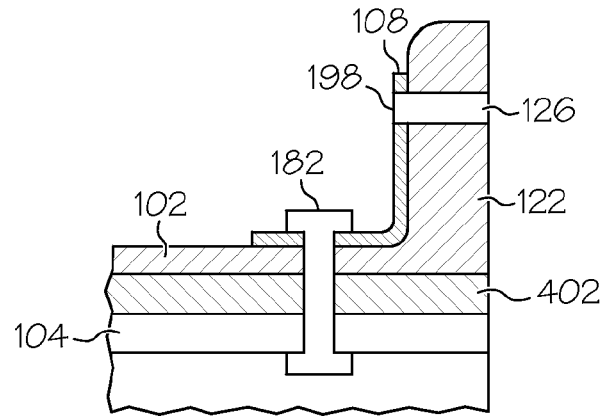
FIG. 4A is a cross-sectional view showing the manner in which the fastener is connected through a rib to connect a valve body and a sleeve.

Returning once again to FIGS. 1-3, it is seen that in addition to the sleeve 104 being adhesively bonded to the valve body inner surface 114, it is also coupled to the valve body via the plurality of brackets 108. As shown in FIG. 4A, at least in the depicted embodiment, the brackets 108 are evenly spaced around the valve body outer surface 112 and are each coupled to the inner sleeve 104 via a fastener 182. Although the specific type of fastener 182 that is used may vary, in the depicted embodiment, each fastener is a rivet 182. In this regard, each of the brackets 108 includes a rivet opening 196, and the valve body 102 and inner sleeve 104 each include a plurality of rivet openings 186 and 188, respectively. Although the number of valve housing and inner sleeve rivet openings 186 and 188 may vary, in the depicted embodiment the valve body 102 and sleeve 104 both include four evenly spaced rivet openings 186 and 188. In this regard, it will be appreciated that the valve body 102 is preferably molded to include four of the previously mentioned ribs 402 on its inner surface 114, and that each of the valve housing rivet openings 186 extends through one of the ribs 402, so that fasteners 182 extend though the ribs 402.

The brackets 108, in addition to being coupled to the inner sleeve 104, are also configured to be coupled to the non-illustrated aircraft bulkhead. More specifically, each bracket 108, at least in the depicted embodiment, is configured as an L-bracket 108 having a first section 192, and a second section 194 that is coupled to, and disposed substantially perpendicular to, the first section 192. The first section 192 is mounted on the valve body 102 and includes a rivet opening 196 (see FIG. 3). Thus, although not explicitly depicted, a plurality of flats (one per bracket 108) is formed on the valve body outer surface 112. The second section 194 is disposed proximate the mount flange 124 and includes a mounting fastener opening 198 (also see FIG. 3). When the brackets 108 are properly mounted on the valve body outer surface 112 and coupled to the inner sleeve 104, the mounting fastener openings 198, as is shown most clearly in FIGS. 1 and 2, are each preferably collocated with one of the mount flange fastener openings 126. Therefore, although not illustrated, the brackets 108 couple the inner sleeve 104 to the aircraft fuselage via the mount flange fastener openings 126 in multiple places around the perimeter of the second flow port 122.

The outflow valve assembly 100 described herein is relatively compact and lightweight, and is fairly simple to design and construct. The valve assembly includes suitable redundancy features that allow the valve assembly 100 to meet regulatory requirements for certain postulated single point failures.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A dual-wall flow passage assembly for a valve, the dual wall flow passage assembly comprising:
a valve body constructed at least partially of a non-metallic material and having an outer surface and an inner surface, the valve body inner surface defining a flow passage having at least two flow ports;
a sleeve disposed within the valve body flow passage, the sleeve constructed at least partially of a metallic material and having at a flow passage formed therein, the sleeve flow passage in fluid communication with the valve body flow passage flow ports;
a plurality of brackets mounted on the valve body outer surface and coupled to the sleeve; and
a plurality of ribs formed on the valve body inner surface and extending radially inwardly therefrom, each rib disposed at least proximate an outer surface of the sleeve; and
a plurality of fasteners, each fastener coupled between one of the plurality of brackets and the sleeve and extending through the valve body and one of the plurality of ribs;
wherein the ribs isolate the valve body from the sleeve and provide redundancy by preventing crack propagation from the valve body to the sleeve.

2. The dual-wall flow passage assembly of claim 1, wherein each fastener is a rivet.

3. The dual-wall flow passage assembly of claim 1, further comprising:
a mount flange disposed proximate one of the valve body flow passage flow ports and extending radially outwardly from the valve body, the mount flange configured to mount the valve body to an aircraft bulkhead.

4. The dual-wall flow passage assembly of claim 3, wherein each of the plurality of brackets includes at least a first section and a second section, the first section mounted on the valve body outer surface, the second section disposed at least proximate the mount flange.

5. The dual-wall flow passage assembly of claim 3, wherein:
one of the valve body flow passage flow ports has a first cross sectional flow area; and
one of the valve body flow passage flow ports has a second cross sectional flow area that is greater than the first cross sectional flow area.

6. The dual-wall flow passage assembly of claim 1, further comprising:
a sealing compound disposed between the sleeve and the valve housing inner surface.

7. The dual-wall flow passage assembly of claim 6, wherein the valve element comprises:
a butterfly plate having an outer periphery;
a reinforcing ring coupled to the butterfly plate; and
a wiper seal disposed between the reinforcing ring and the butterfly plate, at least a portion of the wiper seal extending beyond the butterfly plate outer periphery.

8. The dual-wall flow passage assembly of claim 1, further comprising:
a valve element disposed within the sleeve flow passage and moveable between at least an open position and a closed position; and
a drive shaft coupled to the valve element and rotationally coupled to the valve housing, whereby rotation of the drive shaft moves the valve element between the open and closed positions.

9. The dual-wall flow passage assembly of claim 1, wherein the metallic material is aluminum.

10. The dual-wall flow passage assembly of claim 1, wherein the non-metallic material is a composite material.

11. The dual-wall flow passage assembly of claim 10, wherein the composite material is selected from the group consisting of fiber reinforced polyetheretherketon (PEEK), and fiber reinforced polyetherimide (PEI).

12. The dual-wall flow passage assembly of claim 1, wherein the valve body further includes an actuator mount surface formed thereon, the actuator mount surface configured to couple to a valve actuator.

13. An outflow valve assembly, comprising:
   a valve body constructed at least partially of a non-metallic material and having a valve body outer surface and a valve body inner surface, the valve body inner surface defining a flow passage having at least two flow ports;
   a sleeve disposed within the valve body flow passage, the sleeve constructed at least partially of a metallic material and having a flow passage formed therein, the sleeve having a sleeve outer surface, the sleeve flow passage in fluid communication with the valve body flow passage flow ports;
   a valve element disposed within the sleeve flow passage and moveable between at least an open position and a closed position;
   a plurality of brackets mounted on the valve body outer surface;
   a plurality of ribs formed on the valve body inner surface and extending radially inwardly therefrom, each rib disposed at least proximate the sleeve outer surface; and
   a plurality of fasteners, each fastener coupled between one of the plurality of brackets and the sleeve and extending through the valve body and one of the plurality of ribs.

14. The outflow valve assembly of claim 13, further comprising:
   a mount flange disposed proximate one of the valve body flow passage flow ports and extending radially outwardly from the valve body, the mount flange configured to mount the valve body to an aircraft bulkhead.

15. The outflow valve assembly of claim 14, wherein each of the plurality of brackets includes at least a first section and a second section, the first section mounted on the valve body outer surface, the second section disposed at least proximate the mount flange.

16. An outflow valve assembly comprising:
   a valve body constructed at least partially of a non-metallic material and having a valve body outer surface and a valve body inner surface, the valve body inner surface defining a flow passage having at least two flow ports;
   a sleeve disposed within the valve body flow passage, the sleeve constructed at least partially of a metallic material and having a flow passage formed therein, the sleeve having a sleeve outer surface, the sleeve flow passage in fluid communication with the valve body flow passage flow ports;
   a valve element disposed within the sleeve flow passage and moveable between at least an open position and a closed position;
   a plurality of brackets mounted on the valve body outer surface;
   a plurality of fasteners, each fastener coupled between one of the plurality of brackets and the sleeve and extending through the valve body; and
   a plurality of ribs formed on the valve body inner surface and extending radially inwardly therefrom, each rib disposed at least proximate an outer surface of the sleeve,
   wherein each fastener is coupled between one of the plurality of brackets and the sleeve and extends through the valve body and one of the plurality of ribs.

17. An outflow valve assembly, comprising:
   a valve body constructed at least partially of a non-metallic material and having an outer surface and an inner surface, the valve body inner surface defining a flow passage having at least two flow ports;
   a mount flange disposed proximate one of the valve body flow passage flow ports and extending radially outwardly from the valve body, the mount flange configured to mount the valve body to an aircraft bulkhead;
   a sleeve disposed within the valve body flow passage, the sleeve constructed at least partially of a metallic material and having at a flow passage formed therein, the sleeve flow passage in fluid communication with the valve body flow passage flow ports;
   a plurality of ribs formed on the valve body inner surface and extending radially inwardly therefrom, each rib disposed at least proximate an outer surface of the sleeve;
   a valve element disposed within the sleeve flow passage and moveable between at least an open position and a closed position;
   a plurality of brackets mounted on the valve body outer surface, each bracket including at least a first section and a second section, the first section mounted on the valve body outer surface, the second section disposed at least proximate the mount flange; and
   a plurality of fasteners, each fastener coupled between one of the plurality of brackets and the sleeve and extending through the valve body and one of the plurality of ribs.

* * * * *